United States Patent
Hund

(10) Patent No.: US 11,146,610 B2
(45) Date of Patent: Oct. 12, 2021

(54) METHOD AND DEVICE FOR DATA EXCHANGE

(71) Applicant: SIEMENS AKTIENGESELLSCHAFT, Munich (DE)

(72) Inventor: Johannes Hund, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 119 days.

(21) Appl. No.: 16/069,791

(22) PCT Filed: Oct. 24, 2016

(86) PCT No.: PCT/EP2016/075539
§ 371 (c)(1),
(2) Date: Jul. 12, 2018

(87) PCT Pub. No.: WO2017/121508
PCT Pub. Date: Jul. 20, 2017

(65) Prior Publication Data
US 2019/0020706 A1    Jan. 17, 2019

(30) Foreign Application Priority Data
Jan. 13, 2016 (DE) ............. 10 2016 200 291.0

(51) Int. Cl.
*H04L 29/06* (2006.01)
*H04L 29/08* (2006.01)

(52) U.S. Cl.
CPC ........ *H04L 65/608* (2013.01); *H04L 65/1066* (2013.01); *H04L 65/80* (2013.01);
(Continued)

(58) Field of Classification Search
CPC ..... H04L 65/608; H04L 67/32; H04L 67/322; H04L 65/1066; H04L 67/02; H04L 65/80
See application file for complete search history.

(56) References Cited

U.S. PATENT DOCUMENTS 9,560,111 B2 * 1/2017 Li ..................... H04L 67/02
2006/0224750 A1 10/2006 Davies
(Continued)

FOREIGN PATENT DOCUMENTS

CN   101557399 A   10/2009
CN   102546819 A   7/2012
(Continued)

OTHER PUBLICATIONS

XMPP Extensions Editor-2, "Proposed XMPP Extension: Quality of Service", Dec. 2015, http://jabber.996255.n3.nabble.com/Proposed-XMPP-Extension-Quality-of-Service-td36001.html (Year: 2015).*
(Continued)

*Primary Examiner* — Ramy M Osman
(74) *Attorney, Agent, or Firm* — Lempia Summerfield Katz LLC

(57) ABSTRACT

The invention relates to a method for data exchange using a virtually real-time protocol, in particular XMPP, which provides an increase in the attribute range by one or more quality-of-service attributes, which provides network elements involved in the data exchange for the determining of a handling of a respective message or stanza according to guidelines of the quality-of-service attribute. In this way, a quality of service can be implemented on an application level. The implementation of a quality of service on an application level guarantees an annotation of each individual stanza during a data transfer of stanzas associated with a plurality of different applications, in terms of their characteristics and expectations In this way, a detailed control of the data exchange can be achieved, on the part of the end
(Continued)

point or client. The quality-of-service adjustments brought about via the quality-of-service attributes can also be passed along to deeper application layers, when necessary. In this way, improved quality-of-service results can be achieved in the network, in particular in load situations.

9 Claims, 1 Drawing Sheet

(52) U.S. Cl.
CPC .............. *H04L 67/02* (2013.01); *H04L 67/32* (2013.01); *H04L 67/322* (2013.01)

(56) References Cited

U.S. PATENT DOCUMENTS

| | | | |
|---|---|---|---|
| 2009/0049489 A1* | 2/2009 | Kure | H04L 47/805 725/93 |
| 2011/0173324 A1* | 7/2011 | Wang | H04L 67/02 709/225 |
| 2011/0321062 A1* | 12/2011 | Pope | G06Q 30/02 719/318 |
| 2014/0219167 A1* | 8/2014 | Santhanam | H04L 67/02 370/328 |
| 2015/0120903 A1* | 4/2015 | Zakharov | H04L 41/5016 709/224 |
| 2017/0272366 A1* | 9/2017 | Bush | H04L 45/302 |
| 2019/0020706 A1* | 1/2019 | Hund | H04L 65/80 |

FOREIGN PATENT DOCUMENTS

| | | |
|---|---|---|
| CN | 104468618 A | 3/2015 |
| WO | 2006107889 A3 | 5/2008 |

OTHER PUBLICATIONS

IP Office of China, "Second Office Action", dated Feb. 2, 2021, Application 201680078889.2 (Year: 2021).*
European Patent Office, "EPO Allowance", dated Oct. 31, 2019, Patent Application 16790301.2 (Year: 2019).*
Schmaus, Florian, "[Standards] Proposed XMPP Extension: Quality of Service", Dec. 10, 2015, https://mail.jabber.org/pipermail/standards/2015-December/030680.html (Year: 2015).*
Saadfurqhan, "Which of These is True for XMPP?", Nov. 8, 2018, https://brainly.in/question/5127712 (Year: 2018).*
German Office Action for German Application No. 102016200291. 0, dated Dec. 21, 2017.
PCT International Search Report and Written Opinion of International Searching Authority dated Jan. 17, 2017 corresponding to PCT International Application No. PCT/EP2016/075539 filed Oct. 24, 2016.
Saint-Andre P.: Extensible Messaging and Presence Protocol (XMPP): Address Format, RFC 6122, Mar. 2011.
Saint-Andre P.: Extensible Messaging and Presence Protocol (XMPP): Core, RFC 6120, Mar. 2011.
Saint-Andre P.: Extensible Messaging and Presence Protocol (XMPP): Instant Messaging and Presence, RFC 6121, Mar. 2011.
Waher Peter: "XEP-xxx: Quality of Service", XP002765636, Gefunden im Internet: URL:http://xmpp.org/extensions/inbox/qos.html; 2015.
Chinese Office Action for Chinese Application No. 201680078889.2 dated Jun. 2, 2020.

* cited by examiner

METHOD AND DEVICE FOR DATA EXCHANGE

CROSS REFERENCE TO RELATED APPLICATIONS

The present patent document is a § 371 nationalization of PCT Application Serial Number PCT/EP2016/075539, filed Oct. 24, 2016, designating the United States which is hereby incorporated by reference in its entirety. This patent document also claims the benefit of DE 102016200291.0 filed Jan. 13, 2016 which is also incorporated by reference in its entirety.

FIELD

Embodiments relate to a method and an apparatus for interchanging data.

BACKGROUND

Communication protocols that make it possible to interchange data in quasi real time are known. After a persistent data connection is set up, for example, over a plurality of network elements, the data are interchanged by "stanzas". In addition to data to be actually interchanged or a "payload", a stanza includes an attribute region containing a type characterization of the stanza and data for addressing a transmitter and a receiver of the stanza. A known quasi-real-time communication protocol "Extensible Messaging and Presence Protocol", abbreviated to XMPP, is specified by the Internet Engineering Task force, IETF, in the Requests for Comment RFC 6120, RFC 6121 and RFC 6122.

Description languages for specifying data formats and the methods used to process the data are known. One description language is "Extensible Markup Language", abbreviated to XML, that is used to describe hierarchically structured data in text form. The description language XML is used to interchange data between computer systems in a platform-independent manner. On account of the textual nature of XML, the descriptive language XML may be read both by machines and by persons.

If XMPP was initially used predominantly for "Instant Messaging" for quasi-real-time communication between two or more subscribers using text messages, the spread of XMPP is increasing in message-oriented middleware applications based on XML, for example, in applications in the context of an "Internet of Things".

Whereas use of XMPP for the requirements of instant messaging, for example, for chat applications, does not require any particular specifications with regard to the quality of the message interchange, message-oriented middleware applications impose requirements on the quality of the message interchange, for example by specified response times or a required throughput of messages. Such requirements imposed on the quality of the message interchange, also known as the Quality of Service (QoS), differ on the basis of the application that is superordinate to the message-oriented middleware application or uses the latter.

Currently known measures for providing a promised quality of service include parameterizing data packet traffic with a reservation, optimization and limitation of data packet rates. The measures are all carried out on layer 3 of the known OSI model (Open Systems Interconnection Model), e.g. the network layer that relates to the switching on the data packet level.

However, measures for providing a quality of service on the network layer are not suitable for message-oriented middleware applications based on quasi-real-time communication protocols since the former control only forwarding of data packets on layer 3 of the OSI model, whereas the latter are intended to control superordinate message interchange on an application layer. Data-packet-oriented quality of service attributes from the network layer are no longer accessible on the superordinate level of the application layer and do not remain invariable, for example, if switched over a plurality of network segment boundaries, as data-packet-oriented attributes may be changed at any time in individual network nodes during the forwarding of data packets. Measures for providing a quality of service when interchanging data between a transmitter and a receiver on the application layer therefore may not be affected using known measures for providing a quality of service on the network layer.

BRIEF DESCRIPTION AND SUMMARY

The scope of the present disclosure is defined solely by the appended claims and is not affected to any degree by the statements within this summary. The present embodiments may obviate one or more of the drawbacks or limitations in the related art.

Embodiments provide a quality of service to be set for a quasi-real-time protocol on the application layer.

In an embodiment for interchanging data using a quasi-real-time protocol, after a data connection is set up via at least one network element, provision is made for data to be interchanged via a plurality of stanzas. In addition to the data to be interchanged, also referred to as useful data or "payload", a stanza includes an attribute region. The attribute region includes attributes for a type characterization of the stanza and data for addressing a transmitter and a receiver of the stanza.

In an embodiment, the attribute region is extended with one or more quality of service attributes that are used by at least one network element involved in interchanging the data to determine handling of a respective stanza, for example, with respect to other stanzas.

When handling a network element involved in interchanging the data between the respective receiver and the respective transmitter (and possibly a plurality of forwarding servers), the attribute region of the stanza is evaluated. The provision of the quality of service attributes in the region includes an advantage that it is not necessary to evaluate the useful data of the stanza. Considerations of instead carrying out a deep inspection, e.g. an analysis of the entire XML contents in the payload of a stanza, may signify considerable additional effort in comparison with the provision of an attribute according to embodiments.

The quality of service attributes may be used by the network element involved in interchanging the data, e.g. the client, a server and forwarding servers ("intermediaries") to determine handling of a respective stanza, for example also to determine handling of a respective stanza with respect to other stanzas, for example, in a prioritization.

Depending on the intended purpose, "handling" of the stanzas may take the following forms:
  Arranging the stanzas in a queueing method, e.g. in the order that outgoing stanzas are transmitted to the receiver, for example.
  Buffering, e.g. in the order that incoming stanzas are processed.
  A forwarding rule or routing, e.g. whether and to where stanzas are forwarded.

According to an embodiment, a quality of service attribute includes:
- a validity period of the stanza for determining a transmission time, after the stanza is irrelevant;
- a priority value for prioritizing the stanza on an application layer; and/or
- an assignment data item for assigning the stanza to an application or a group of applications.

The assignment of the stanza to an application or to a group of applications may be advantageous since, if an XMPP channel is used for various applications, various quality of service specifications or constraints, for example with respect to response times, throughput etc., may be specified and are very application-specific. Applications may also have different importance for the overall system. The quality of service settings achieved using the quality of service attributes may also be passed on to lower application layers if necessary. Better quality of service results may therefore be provided, for example, in the case of load situations in the network.

DETAILED DESCRIPTION

A method for interchanging data on the application layer using a quasi-real-time protocol, for example XMPP, is provided, in which, after a data connection that is persistent for a definable period is set up, for example using the packet-switching transport protocol TCP (Transmission Control Protocol), via at least one network element, data are interchanged by a plurality of stanzas.

Figure 1:
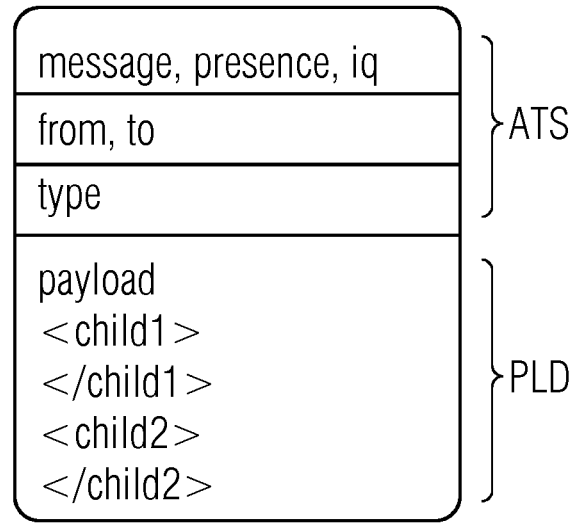
FIG. 1 depicts a schematic illustration of a structure of a stanza according to an embodiment.

FIG. 1 depicts a stanza including an attribute region ATS and a useful data region PLD.

Type attributes "message", "presence", "iq" illustrated in the drawing define a type of stanza. A stanza of the type "message" is used to interchange text messages, a stanza of the type "presence" is used to interchange presence and availability information and a stanza having the type "iq" (info/query) provides a request/response mechanism for interchanging XML structures.

Attributes "from" and "to" depicted in the drawing address a receiver and a transmitter. The addressing is carried out by JIDs (Jabber Identifier) that resemble an email address. A further attribute id (not depicted) is used to assign stanza pairs.

An attribute "type" illustrated in the drawing is used to more accurately distinguish the stanza type in an extension of the type attributes mentioned above.

Figure 2:
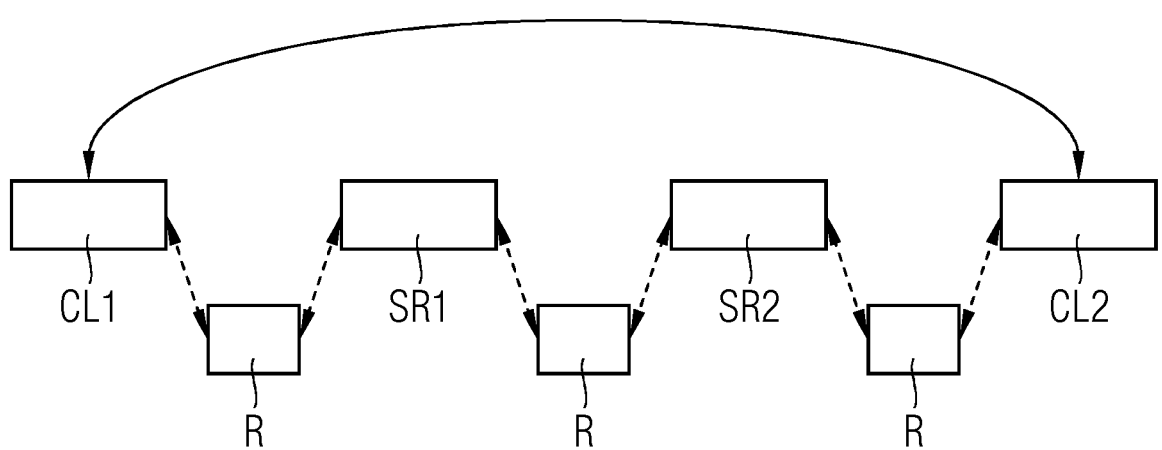
FIG. 2 depicts a schematic illustration of data interchange via a plurality of network elements between a first client and a second client according to an embodiment.

FIG. 2 depicts a schematic illustration of data interchange via a plurality of network elements between a first client and a second client CL1, CL2. Between the clients, e.g. communication partners, that occasionally and temporarily act as transmitters and/or receivers, a plurality of network elements, here a first server SR1, a second server SR2 and a plurality of routers R, are involved in interchanging the data between the two clients CL1, CL2. In contrast to packet-oriented data transmission—depicted in the figure by dashed double-headed arrows between the individual network elements—on the network layer, data are interchanged on the application layer only via the clients CL1, CL2 and the servers or "intermediaries" SR1, SR2 in between. After the persistent data connection is successfully set up, further data are interchanged—depicted in the figure by an arcuate double-headed arrow between the clients CL1, CL2—as direct end-to-end communication.

An example structure of a stanza is described in more detail below. In XML notation, the stanza includes the following structure:

```
<iq to='bar' type='set'>
    <payload ... />
</iq>
```

The first line
<iq to='bar' type='set'>
includes the attribute region, that is adjoined in the second line by the useful data region PLD
<payload ... />.
The last line
</iq>
concludes the stanza.

The type attribute "iq" specifies a character of the stanza to the effect that it is used to initiate a request/response mechanism for interchanging XML structures. The type of stanza is specified by a further "type" attribute to the effect that the stanza is used to set a value on the target system of the receiver:
type='set'.

The stanza is addressed to an example client as a receiver denoted here by "bar" in a simplified manner. The addressing of the receiver is shortened only for illustrative purposes may be affected in a real implementation by a complete JID (Jabber Identifier), for instance of the form: "bar@example.com/home".

A stanza from the client "bar" responding to the request includes the following exemplary structure:

```
<iq from='bar' to= 'foo' type='result'>
    <payload ... />
</iq>
```

The transmitting client "bar" explicitly designated the time uses the stanza to transmit a result "result" of the previously transmitted setting request "set" back to the initiator "foo" acting the time as a receiver.

According to an embodiment, the stanza pair described above is now provided, in the attribute region ATS, with at least one quality of service attribute, which attributes make it possible for the server SRV1, SRV2 or else the clients CL1, CL2 to classify, inter alia, which stanza includes which prerequisites with regard to the quality of service:

```
<iq to='bar' type='set'
    qos:prio='high' qos:ttl='20'>
    <payload ... />
</iq>
```

In one configuration, two quality of service attributes or QoS attributes, e.g. "prio" and "ttl", are provided. The value of the quality of service attribute "prio" specifies a priority level for forwarding and processing the respective stanza to the network elements and clients involved in interchanging the data or generally a measure for handling the stanza, for example, with respect to other stances of lower priority. In the example above, the priority of the stanza is set to "high" with the instruction
  qos:prio='high'.

The value of the quality of service attribute "ttl" (Time to Live) specifies a requirement imposed on the transmission time after the stanza is irrelevant or a time for handling the stanza to the network elements and clients involved in interchanging the data. In the example above, the time to live of the stanza is set to 20 seconds with the instruction
  qos:ttl='20'.

A stanza from the client "bar" responding to the request then includes the following exemplary structure:

```
<iq from='bar' to= 'foo' type='result'
qos:prio='high' qos:ttl='18'>
    <payload... />
</iq>
```

In the example above, the priority of the responding stanza is likewise set to "high" and the time to live is set to 18 seconds.

The method for interchanging data using a quasi-real-time protocol, for example XMPP, provides for the attribute region to be extended with one or more quality of service attributes that are used by network elements involved in interchanging the data to determine handling of a respective message or stanza according to specifications of the quality of service attribute, making it possible to implement a quality of service on an application layer.

In the case of data transmission of a plurality of different stanzas assigned to applications, the implementation of a quality of service on the application layer provides that each individual stanza is annotated with respect to its properties and expectations. The interchange of data may therefore be controlled in a more detailed manner by the end points or clients. The quality of service settings achieved using the quality of service attributes may also be passed on to lower application layers. Better quality of service results may therefore be achieved, for example, in the case of load situations in the network.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for interchanging data using a quasi-real-time protocol, the method comprising:
  setting up, via at least one network element, a persistent data connection wherein data is interchangeable by a plurality of stanzas;
  interchanging, via the persistent data connection, the data by at least one stanza of the plurality of stanzas, a structure of the at least one stanza comprising an attribute region and a payload, the attribute region containing a type characterization of the stanza, data for addressing a transmitter and a receiver of the stanza, and at least one quality of service attribute; and
  evaluating the at least one quality of service attribute on an application layer of the at least one network element involved in interchanging the data;
  wherein the at least one quality of service attribute is used by the at least one network element in interchanging the data to prioritize transmission of the at least one stanza of the plurality of stanzas over transmission of at least one other different stanza of the plurality of stanzas without performing an inspection of the payload of the at least one stanza.

2. The method of claim 1, wherein the quasi-real-time protocol is configured according to the Extensible Messaging and Presence Protocol (XMPP).

3. The method of claim 1, wherein the quality of service attribute comprises at least one of:
  a validity period of the at least one stanza for determining a transmission time, after which the at least one stanza is irrelevant;
  a priority value for prioritizing the at least one stanza on an application layer; or
  an assignment data item for assigning the at least one stanza to an application or a group of applications.

4. A network element for interchanging data using a quasi-real-time protocol, the network element comprising:
  a data connection module configured for setting up a persistent data connection;
  an interchanging module configured for interchanging a plurality of stanzas via the persistent data connection, a structure of each stanza of the plurality of stanzas comprising an attribute region and a payload, the attribute region containing a type characterization of the stanza, data for addressing a transmitter and a receiver of the stanza, and at least one quality of service attribute, the interchanging module further configured for evaluating the at least one quality of service attribute on an application layer of at least one network element involved in interchanging the data; and
  a handling module configured to handle, without performing an inspection of the payload of a respective stanza of the plurality of stanzas, the respective stanza with respect to other stanzas of the plurality of stanzas using the quality of service attribute, wherein handling the respective stanza comprises prioritizing interchanging the respective stanza over interchanging at least one other stanza of the plurality of stanzas.

5. The network element of claim 4, wherein the quasi-real-time protocol is configured according to the Extensible Messaging and Presence Protocol (XMPP).

6. The network element of claim 4, wherein the quality of service attribute comprises at least one of: a validity period of the stanza for determining a transmission time, after the stanza is irrelevant; a priority value for prioritizing the stanza on an application layer; or an assignment data item for assigning the stanza to an application or a group of applications.

7. A non-transitory computer-readable storage medium storing instructions executable by a controller for interchanging data using a quasi-real-time protocol, the instructions comprising:

setting up a persistent data connection via at least one network element, wherein data is interchanged over the persistent data connection by a plurality of stanzas;

interchanging, over the persistent data connection, the data by at least one stanza, a structure of the at least one stanza comprising an attribute region and a payload, the attribute region containing a type characterization of the stanza, data for addressing a transmitter and a receiver of the stanza, and at least one quality of service attribute;

evaluating the at least one quality of service attribute on an application layer of the at least one network element involved in interchanging the data; and delaying interchanging of the at least one stanza over at least one other different stanza based on the at least one quality of service without performing an inspection of the payload of the at least one stanza.

8. The non-transitory computer-readable storage medium of claim 7, wherein the quasi-real-time protocol is configured according to the Extensible Messaging and Presence Protocol (XMPP).

9. The non-transitory computer-readable storage medium of claim 7, wherein the quality of service attribute comprises at least one of: a validity period of the at least one stanza for determining a transmission time, after the at least one stanza is irrelevant; a priority value for prioritizing the at least one stanza on an application layer; or an assignment data item for assigning the at least one stanza to an application or a group of applications.

* * * * *

UNITED STATES PATENT AND TRADEMARK OFFICE
CERTIFICATE OF CORRECTION

PATENT NO. : 11,146,610 B2
APPLICATION NO. : 16/069791
DATED : October 12, 2021
INVENTOR(S) : Johannes Hund Page 1 of 1

It is certified that error appears in the above-identified patent and that said Letters Patent is hereby corrected as shown below:

In the Claims

Column 7, Line 16, Claim 7:
"quality of service without performing an inspection of"
Should be replaced with:
"quality of service attribute without performing an inspection of"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*